United States Patent
Barkan et al.

(10) Patent No.: US 9,697,406 B2
(45) Date of Patent: *Jul. 4, 2017

(54) COMPACT MIRROR ARRANGEMENT FOR AND METHOD OF CAPTURING LIGHT AND ILLUMINATING TARGETS THROUGH A HORIZONTAL WINDOW OF A POINT-OF-TRANSACTION WORKSTATION

(71) Applicant: SYMBOL TECHNOLOGIES, LLC, Lincolnshire, IL (US)

(72) Inventors: Edward D. Barkan, Miller Place, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,018

(22) Filed: Mar. 18, 2016

(65) Prior Publication Data

US 2016/0335466 A1    Nov. 17, 2016

Related U.S. Application Data

(63) Continuation-in-part of application No. 14/713,735, filed on May 15, 2015, now Pat. No. 9,298,962.

(51) Int. Cl.
*G06K 7/10* (2006.01)
*G06K 7/14* (2006.01)

(52) U.S. Cl.
CPC ......... *G06K 7/1413* (2013.01); *G06K 7/1096* (2013.01); *G06K 7/10564* (2013.01); *G06K 7/10831* (2013.01)

(58) Field of Classification Search
CPC .... G06K 7/10693; G06K 7/1096; G06K 7/10; G06K 7/10722; G06K 7/10732
USPC .............. 235/454, 459, 462.32, 462.36, 470
See application file for complete search history.

(56) References Cited

U.S. PATENT DOCUMENTS

| | | |
|---|---|---|
| 5,886,336 A | 3/1999 | Tang et al. |
| 5,892,214 A | 4/1999 | Lindacher |
| 8,740,075 B2 | 6/2014 | Drzymala et al. |
| 8,746,569 B2 | 6/2014 | Olmstead |
| 2010/0019043 A1 | 1/2010 | Sackett et al. |
| 2012/0118963 A1 | 5/2012 | Drzymala et al. |
| 2012/0145790 A1 | 6/2012 | Drzymala et al. |
| 2014/0183263 A1 | 7/2014 | Chen et al. |

OTHER PUBLICATIONS

International Search Report and Written Opinion mailed Jul. 8, 2016 in counterpart PCT application PCT/US2016/023748.

*Primary Examiner* — Seung Lee
(74) *Attorney, Agent, or Firm* — Yuri Astvatsaturov

(57) ABSTRACT

A pair of overhead mirror portions splits a field of view of an imager into first and second subfields of view. An illuminating assembly is energized to illuminate a target. A first part of the imager is exposed to capture return illumination light from the target passing through a horizontal window of a workstation over the first subfield of view, and a second part of the imager is exposed to capture return illumination light from the target passing through the horizontal window over the second subfield of view.

20 Claims, 9 Drawing Sheets

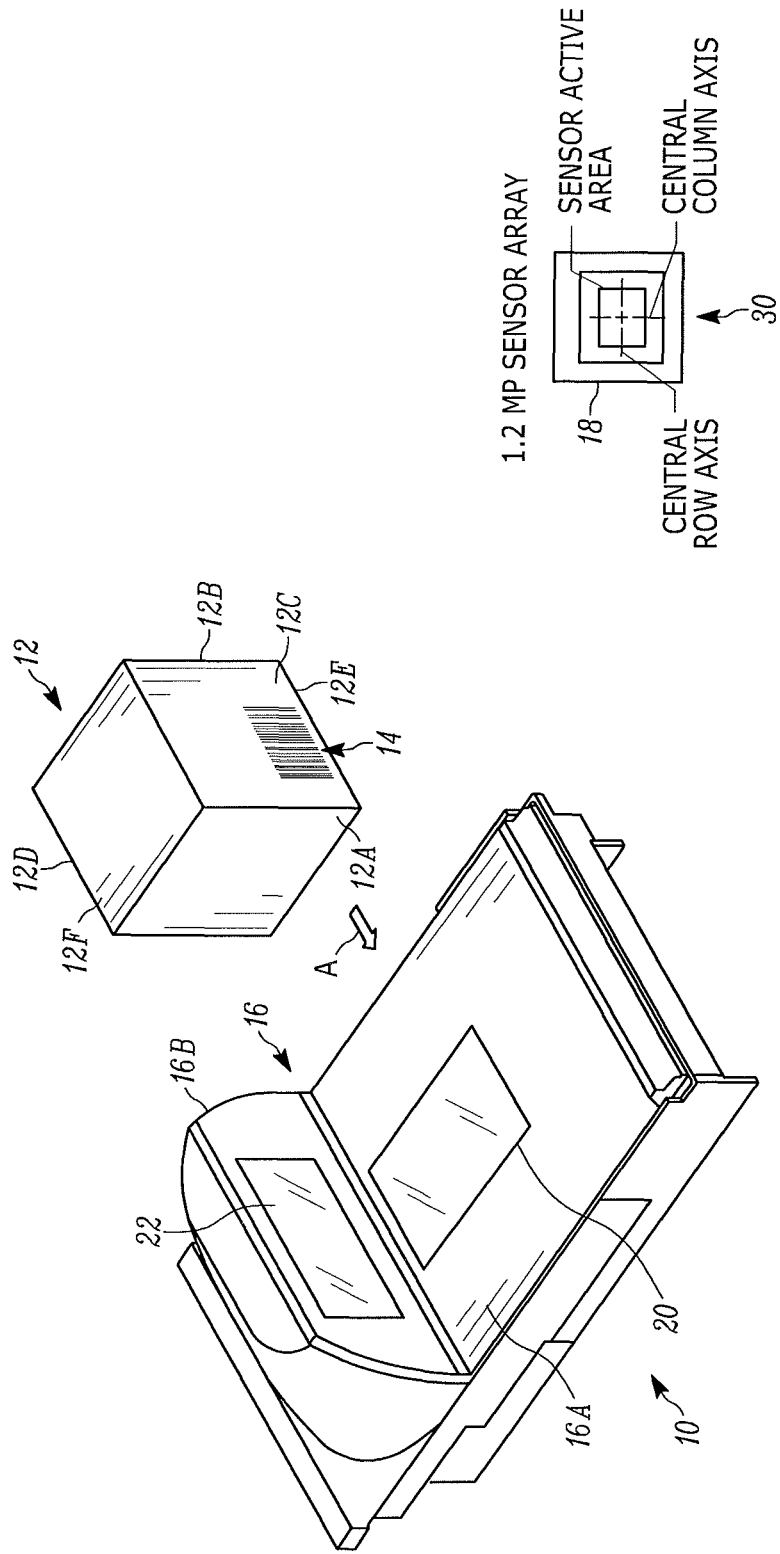

US 9,697,406 B2

COMPACT MIRROR ARRANGEMENT FOR AND METHOD OF CAPTURING LIGHT AND ILLUMINATING TARGETS THROUGH A HORIZONTAL WINDOW OF A POINT-OF-TRANSACTION WORKSTATION

RELATED APPLICATIONS

This is a Continuation-In-Part application of U.S. patent application Ser. No. 14/713,735, filed May 15, 2015.

BACKGROUND OF THE INVENTION

The present disclosure relates generally to a compact mirror arrangement for, and a method of, capturing return light from a target, such as a bar code symbol, and also for illuminating the target, through a horizontal window of a point-of-transaction workstation, especially a dual window, bioptical workstation.

It is known to use solid-state imagers in single or dual window, point-of-transaction workstations to electro-optically read, by image capture, symbol targets, such as one- or two-dimensional bar code symbols, and/or to image document targets, such as receipts, prescriptions, driver's licenses, etc., the targets being associated with products to be identified and processed, e.g., purchased, at the workstation provided at a countertop of a checkout stand in supermarkets, warehouse clubs, department stores, and other kinds of retailers. The products are typically slid or moved by a user across, or presented to and momentarily held steady at a central region of, a generally horizontal window that is mounted in a horizontal platform and that faces upwardly above the countertop, and/or a generally vertical or upright window that is mounted in a raised vertical tower and that faces the user. The known workstations utilize a plurality of illuminating assemblies to illuminate the target with bright, pulsed illumination light, and multiple mirror arrangements to direct return illumination light from the products to one or more imagers along three or more, asymmetrical fields of view, or subfields, that pass through the windows along different directions in order to provide a full coverage scan zone that extends above the horizontal window and in front of the upright window as close as possible to the countertop, and extends sufficiently high above the countertop, and extends as wide as possible across the width of the countertop, to enable reliable reading of a target that could be positioned anywhere on all six sides of a three-dimensional product. The scan zone projects into space away from the windows and grows in volume rapidly in order to cover targets on products that are positioned not only on the windows, but also at working distances therefrom.

As advantageous as such known workstations have been, their multiple mirror arrangements, especially those associated with their horizontal windows, have many mirrors, each of which has to be manufactured, assembled and adjusted in position, and as a result, their multiple mirror arrangements are costly in manufacture and assembly, and occupy a relatively large volume of space, thereby causing their platforms to be correspondingly large in depth and bulky and not well suited to fit in cramped venues. Moreover, the bright, pulsed illumination light from one illuminating assembly can sometimes reflect off the mirrors and be directed towards the user's eyes, thereby constituting a repetitive source of annoyance that is disturbing to the user, or even sometimes to nearby customers.

Accordingly, it would be desirable to reduce the number of mirrors to be manufactured, assembled and adjusted in such workstations, to configure the mirror arrangements associated with the horizontal windows to be more compact in volume and to be less expensive in cost, to configure the horizontal platforms to take up less space, and to reduce, if not prevent, illumination light from disturbing users and customers, all without sacrificing the size of the full coverage scan zones and the performance of the workstations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a perspective view of a dual window, bioptical, point-of-transaction workstation operative for reading a target on a multi-sided product passing through the workstation by image capture.

FIG. 2 is a top plan view of a sensor array of an imager for use in the workstation of FIG. 1.

Figure 3:
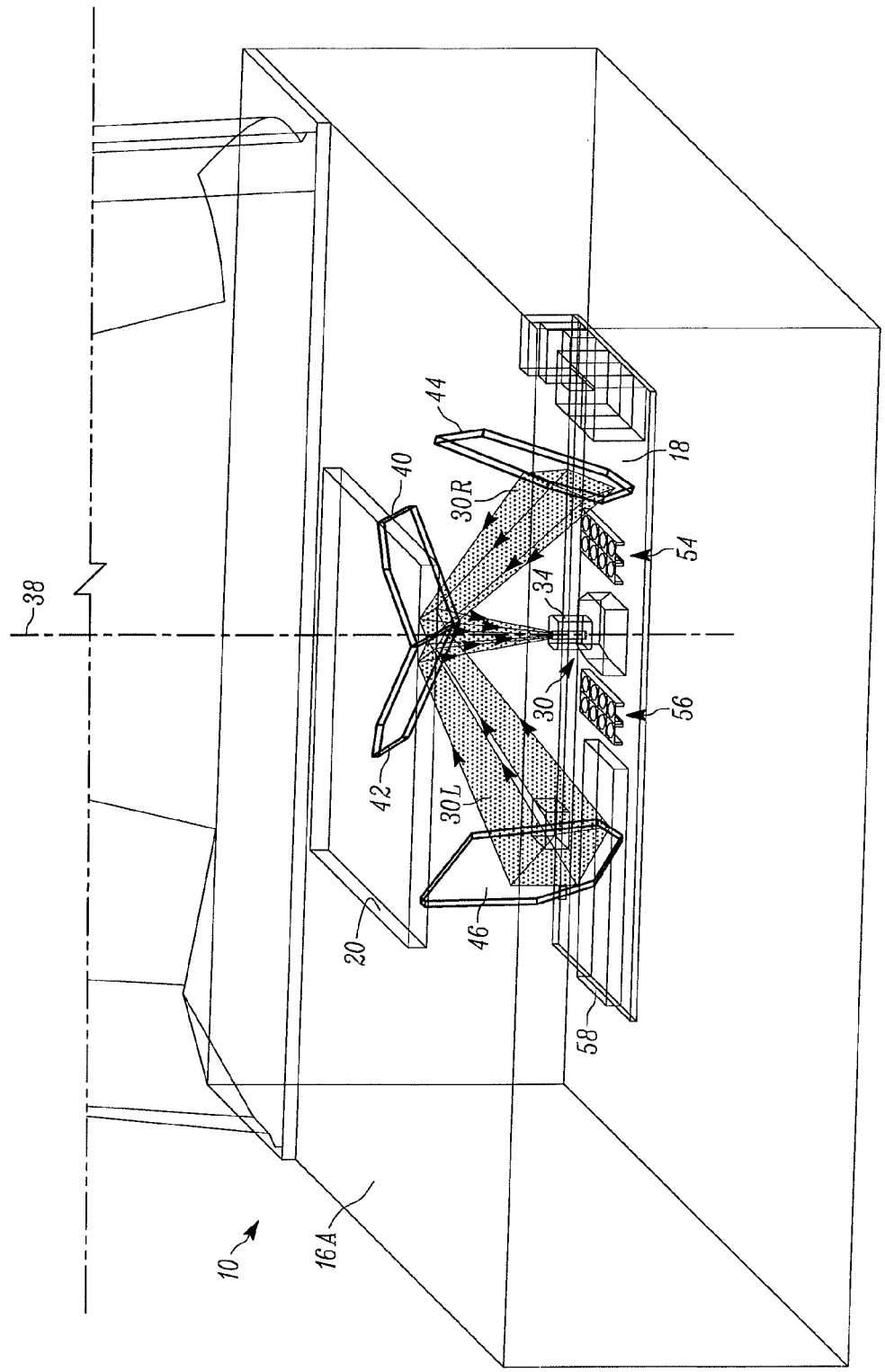
FIG. 3 is an enlarged, perspective view of part of a compact optical arrangement in the workstation of FIG. 1 depicting one embodiment of an overhead splitter for splitting the field of view of the imager of FIG. 2 in trailing parts of a folded optical path.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an apparatus for imaging targets, such as symbol targets and/or document targets. The apparatus includes a housing and a horizontal window supported by the housing. In a preferred embodiment, the horizontal window is mounted in a horizontal platform of a point-of-transaction workstation, especially a dual window, bioptical workstation having an upright window that, together with the horizontal window, bound a scan zone through which the products are passed through the workstation. In another embodiment, the horizontal window is mounted horizontally in a single window, flat bed workstation. In either case, products are processed in the workstation by electro-optically imaging targets associated with the products.

The apparatus further includes an exposable, solid-state imager, preferably a two-dimensional, charge coupled device (CCD) array, or a complementary metal oxide semiconductor (CMOS) array, supported by the housing and having an array of image sensors with a field of view looking upwardly along a vertical axis, and an energizable, illuminating assembly supported by the housing and operative for illuminating a target through the horizontal window with illumination light. The apparatus further includes a compact optical arrangement supported by the housing, and including a pair of first and second overhead mirror portions positioned along the axis directly above the imager and operative for splitting the field of view of the imager into a pair of first and second subfields of view, a pair of first and second relay mirrors spaced away from the axis and respectively facing the first and second overhead mirror portions, and a pair of first and second field mirrors spaced away from the axis and respectively facing the first and second relay mirrors.

The apparatus still further includes a controller, e.g., a programmed microprocessor, for energizing the illuminating assembly to illuminate the target, and for exposing a first part of the imager to capture return illumination light from the target passing through the horizontal window and successively reflected by the first field mirror, the first relay mirror, and the first overhead mirror portion to the imager over the first subfield of view, and for exposing a second part of the imager to capture return illumination light from the target passing through the horizontal window and successively reflected by the second field mirror, the second relay mirror, and the second overhead mirror portion to the imager over the second subfield of view. Advantageously, the illuminating assembly includes a pair of first and second illumination light sources, and the controller is further operative for energizing the first and second illumination light sources for illuminating the target with illumination light. The first overhead mirror portion, the first relay mirror, and the first field mirror successively reflect the illumination light emitted by the first illumination light source to the target, and the second overhead mirror portion, the second relay mirror, and the second field mirror successively reflect the illumination light emitted by the second illumination light source to the target.

Another aspect of this disclosure relates to a method of imaging targets. The method is performed by supporting a horizontal window on a housing, directing a field of view of an exposable, solid-state imager to look upwardly along a vertical axis, illuminating a target through the horizontal window with illumination light from an energizable illuminating assembly, splitting the field of view of the imager into a pair of first and second subfields of view by positioning a pair of first and second overhead mirror portions along the axis directly above the imager, spacing a pair of first and second relay mirrors away from the axis to respectively face the first and second overhead mirror portions, spacing a pair of first and second field mirrors away from the axis to respectively face the first and second relay mirrors, energizing the illuminating assembly to illuminate the target, exposing a first part of the imager to capture return illumination light from the target passing through the horizontal window and successively reflected by the first field mirror, the first relay mirror, and the first overhead mirror portion to the imager over the first subfield of view, and exposing a second part of the imager to capture return illumination light from the target passing through the horizontal window and successively reflected by the second field mirror, the second relay mirror, and the second overhead mirror portion to the imager over the second subfield of view.

Turning now to the drawings, FIG. 1 depicts a dual window, bioptical, point-of-transaction workstation 10 for electro-optically imaging targets 14, such as a one-dimensional, Universal Product Code (UPC) symbol, associated with multi-sided, three-dimensional products 12, and is typically used by retailers to process transactions involving the purchase of the products 12 bearing, or printed or associated with, the identifying target 14. The workstation 10 includes a housing 16 having a generally horizontal window 20 located in a generally horizontal plane and supported by a horizontal housing portion or platform 16A, and an upright window 22 located in a generally upright plane that intersects the generally horizontal plane and supported by a raised housing portion or vertical tower 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 typically measures about four inches in width by about six inches in length, while the generally upright window 22 measures about seven inches in width by about four inches in length. The products are passed by an operator or a customer through a scan zone, which occupies the space at and above the horizontal window 20, and also occupies the space at and in front of the upright window 22.

The target 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The target 14 could also be a non-symbol target, such as a personal check, a credit card, a debit card, a prescription, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes.

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. The product 12 can be tilted or moved in other directions through the workstation 10.

As best shown in FIG. 3, an exposable, solid-state imager 30 is supported on a printed circuit board 18 within the housing 16. The imager 30 has a sensor array of image sensors with a field of view diagrammatically shown by speckles in the various views. The imager 30 preferably comprises a two-dimensional, charge coupled device (CCD) array, or a complementary metal oxide semiconductor (CMOS) array, of image sensors of megapixel size, e.g., 1280 pixels wide×960 pixels high. In a preferred embodiment, the field of view of the imager 30 measures about 15 degrees by 30 degrees. The array of the imager 30 extends along mutually perpendicular, row and column, directions. Thus, as shown in FIG. 2, the imager 30 has a longer central row axis and a shorter central column axis. The imager 30 includes an imaging lens assembly 34 for capturing return light from the target 14 and for projecting the captured return light onto the sensor array.

In accordance with this disclosure, a compact optical arrangement is supported by the housing 16 and is operative, as described in detail below, for splitting the field of view of the imager 30 into a pair of symmetrical, first and second subfields of view 30R, 30L along which return light from the target 14 to be imaged passes through and past the horizontal window 20 along a succession of mirrors to the imager 30. These subfields are shown in the drawings with speckles. As described below, this optical arrangement associated with the horizontal window 20 is configured to have fewer mirrors to be manufactured, assembled and adjusted, to have fewer and symmetrical subfields passing through the horizontal window 20, to be more compact in volume, and to be less expensive in cost, as compared to the known optical arrangements, all without sacrificing the size of the scan zone of the workstation 10 and the performance of the workstation 10.

Figure 4:
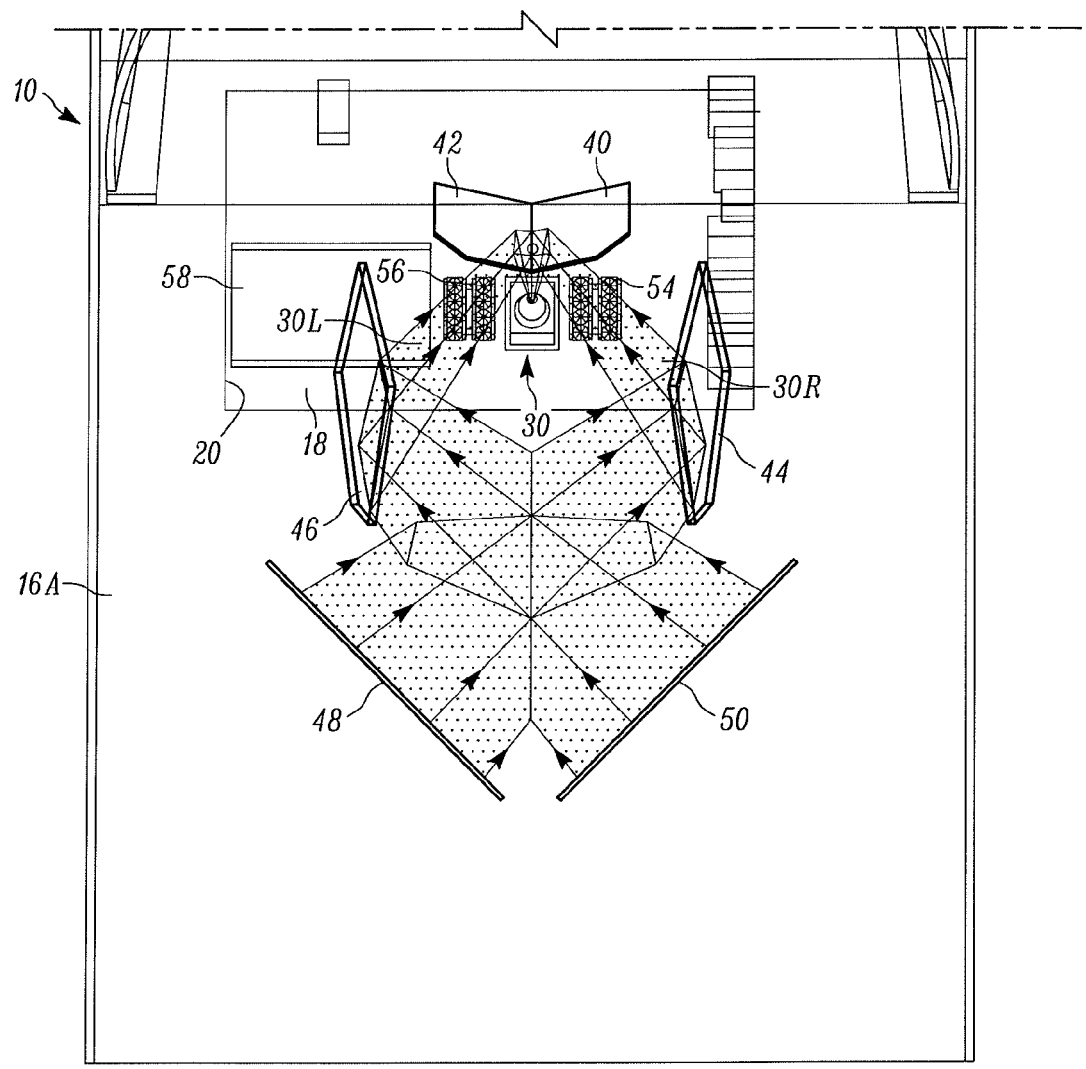
FIG. 4 is an enlarged, perspective view of an additional part of the optical arrangement of FIG. 3 diagrammatically depicting intermediate parts of the folded optical path of the field of view of the imager of FIG. 2.

More particularly, as best seen in FIG. 3, the imager 30 is mounted on the board 18 to look upwardly along a vertical axis 38 in a direction perpendicular to the plane of the board 18. The optical arrangement includes a pair of first and second overhead mirror portions 40, 42 positioned along the axis 38 directly above the imager 30 and operative for splitting the field of view of the imager 30 into the pair of first and second subfields of view 30R, 30L. The optical arrangement further includes a pair of first and second relay mirrors 44, 46 spaced away from the axis 38 and respectively facing the first and second overhead mirror portions 40, 42. The optical arrangement still further includes, as best seen in FIG. 4, a pair of first and second field mirrors 48, 50 spaced away from the axis 38 and respectively facing the first and second relay mirrors 44, 46.

Figure 7:
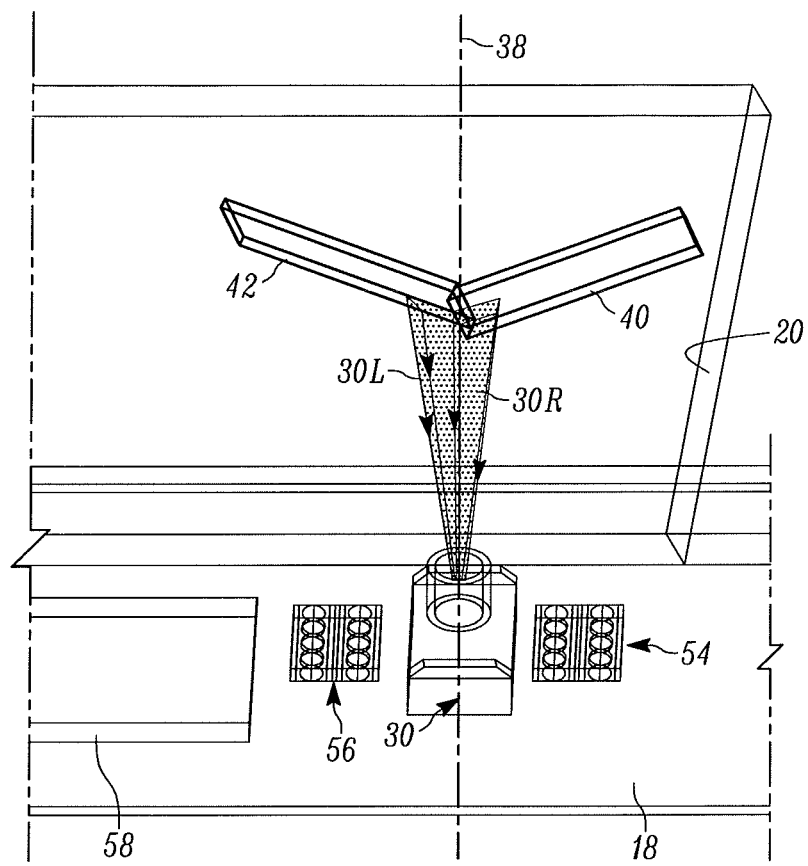
FIG. 7 is a perspective view analogous to FIG. 3 and showing a different embodiment of the overhead splitter.

As illustrated in FIG. 3, the overhead mirror portions 40, 42 are a pair of separate, generally planar, fold mirrors having beveled edges abutting each other. However, the overhead mirror portions 40, 42 can also be a single, bent mirror, or a triangular wedge. As illustrated in FIG. 7, the overhead mirror portions 40, 42 can be separate, generally planar, fold mirrors having beveled edges that are spaced apart along the axis 38 to provide a sharp edge between the subfields of view 30R, 30L. Each of the relay mirrors 44, 46 and each of the field mirrors 48, 50 is a generally planar, fold mirror. It will be noted that the first relay mirror 44 and the first field mirror 48 are spaced well apart at opposite sides of the axis 38, and that the second relay mirror 46 and the second field mirror 50 are also spaced well apart at opposite sides of the axis 38, thereby increasing the length of the optical path along which the return light from the target 14 travels en route to the imager 30. A longer optical path allows the imager 30 to have a narrower field of view, which maintains sensor (pixel) resolution of the imager along a longer range of working distances relative to the horizontal window 20. The set of mirrors 40, 44, 48 and the set of mirrors 42, 46, 50 are symmetrically positioned relative to the axis 38. In addition, the set of mirrors 40, 44, 48 and the set of mirrors 42, 46, 50 are oriented relative to one another to reflect the return illumination light along non-skewed, optical paths.

Also illustrated is an energizable, illuminating assembly that preferably comprises a pair of first and second illumination sources 54, 56 for uniformly illuminating the target 14 with illumination light in the scan zone. Each illuminating source 54, 56 includes at least one, and preferably, a plurality of light emitting diodes (LEDs). The first and second illumination light sources 54, 56 are preferably mounted on the board 18 adjacent the imager 30 at opposite sides thereof A controller 58 or programmed microprocessor is mounted on the board 18 and is operatively connected to the illumination sources 54, 56 for energizing the illumination sources to illuminate the target 14. The controller 58 is also operatively connected to the imager 30 for exposing a first part of the imager 30 to capture return illumination light from the target 14 passing through the horizontal window 20 and successively reflected by the first field mirror 48, the first relay mirror 44, and the first overhead mirror portion 40 to the imager over the first subfield of view 30R. The first part of the imager 30 to be exposed is preferably, as shown in FIG. 2, the half of the sensor active area above the central row axis. The controller 58 is also operative for exposing a second part of the imager 30 to capture return illumination light from the target 14 passing through the horizontal window 20 and successively reflected by the second field mirror 50, the second relay mirror 46, and the second overhead mirror portion 42 to the imager 30 over the second subfield of view 30L. The second part of the imager 30 to be exposed is preferably, as shown in FIG. 2, the half of the sensor active area below the central row axis. The controller 58 is also tasked with processing the captured illumination light in at least one of the subfields of view 30R, 30L to read the target 14, and to decode the target 14 if the target is a symbol.

Figure 5:
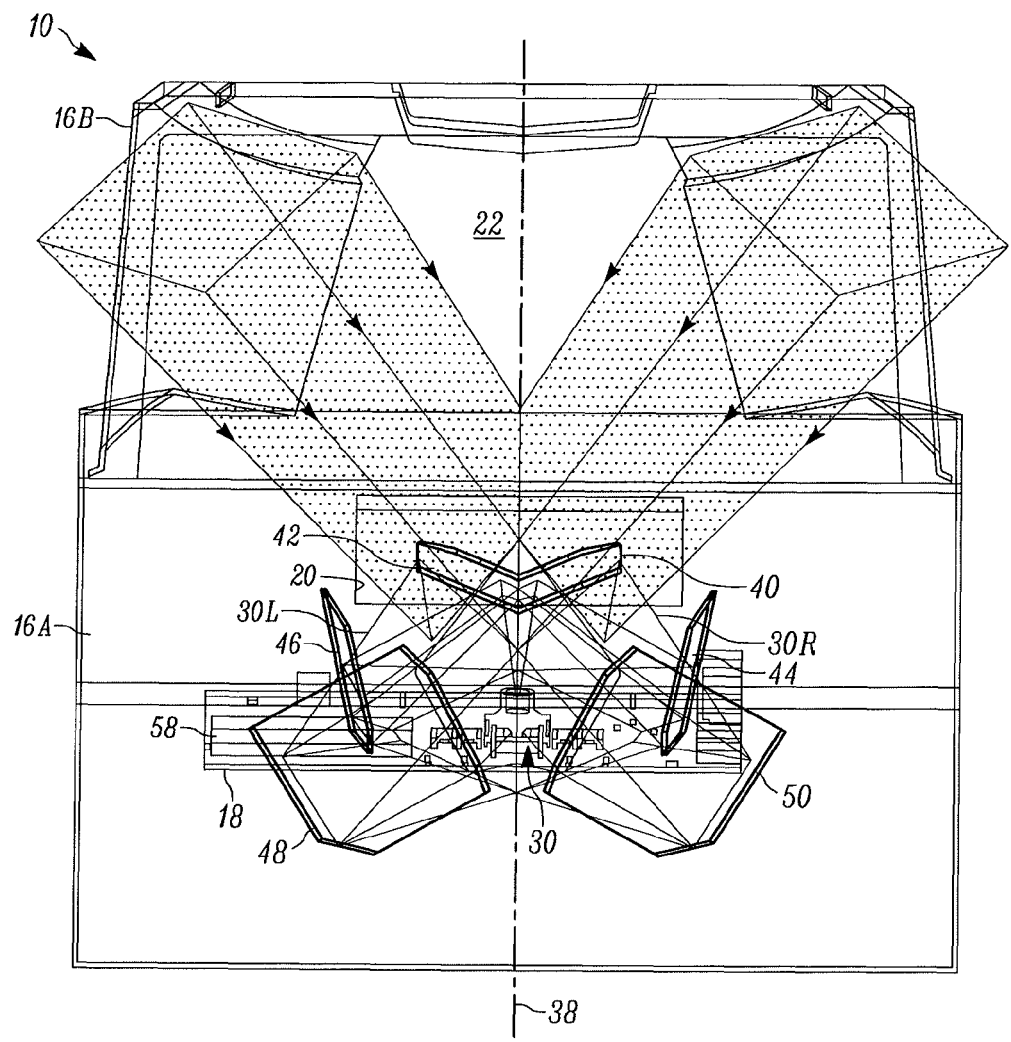
FIG. 5 is an enlarged, front, perspective view of leading parts of the optical arrangement of FIG. 4 that passed through a horizontal window of the workstation.
Figure 6:
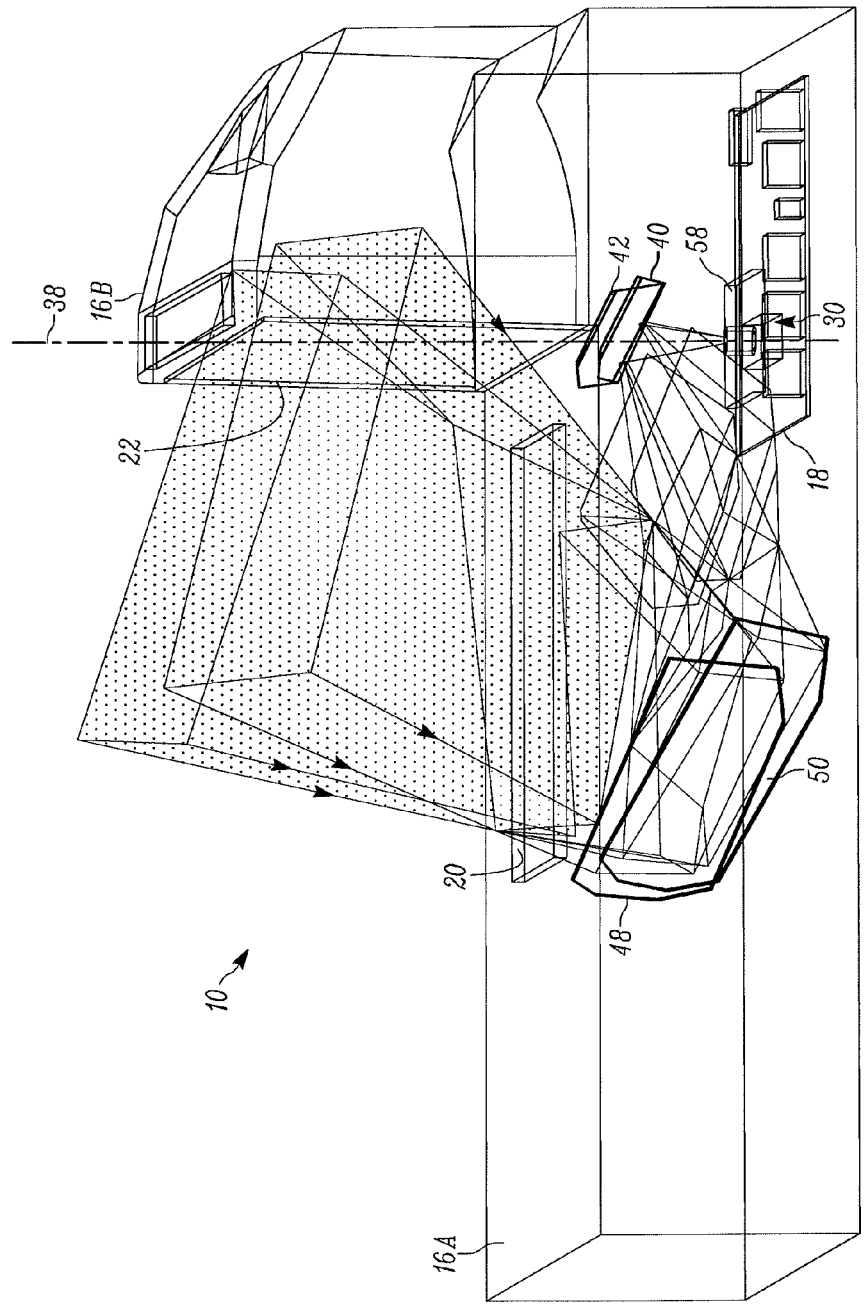
FIG. 6 is an enlarged, side, perspective view of the optical arrangement of FIG. 5 diagrammatically depicting the folded optical path of the field of view of the imager of FIG. 2 that passed through the horizontal window.

Thus, as shown in FIGS. 5-6, the return illumination light in the subfield 30R is initially inclined relative to, and slanted towards, the upright window 22, and then passes through the horizontal window 20 to the first field mirror 48, whereupon the light is reflected to the first relay mirror 44, whereupon the light is reflected to the first overhead mirror portion 40, whereupon the light is reflected vertically downwardly to the imager 30 over the subfield 30R. Similarly, the return illumination light in the subfield 30L is initially inclined relative to, and slanted towards, the upright window 22, and then passes through the horizontal window 20 to the second mirrors 50 and 46 in succession, whereupon the light is reflected to the second overhead mirror portion 42, whereupon the light is reflected vertically downwardly to the imager 30 over the subfield 30L.

Figure 8:
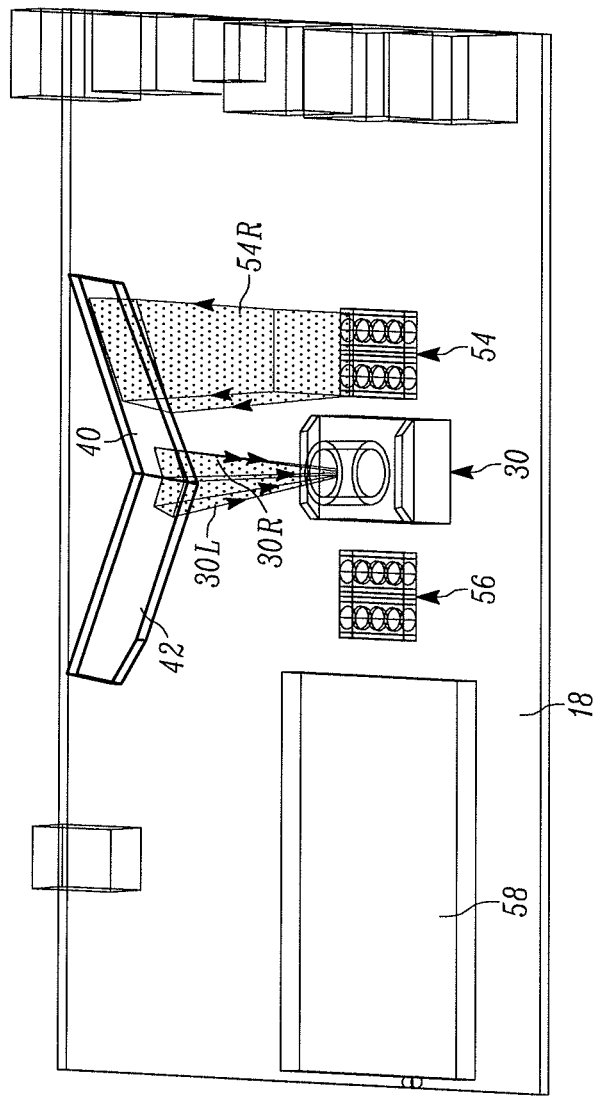
FIG. 8 is a view analogous to FIG. 3 and showing a trailing part of the path along which illumination light travels.
Figure 9:
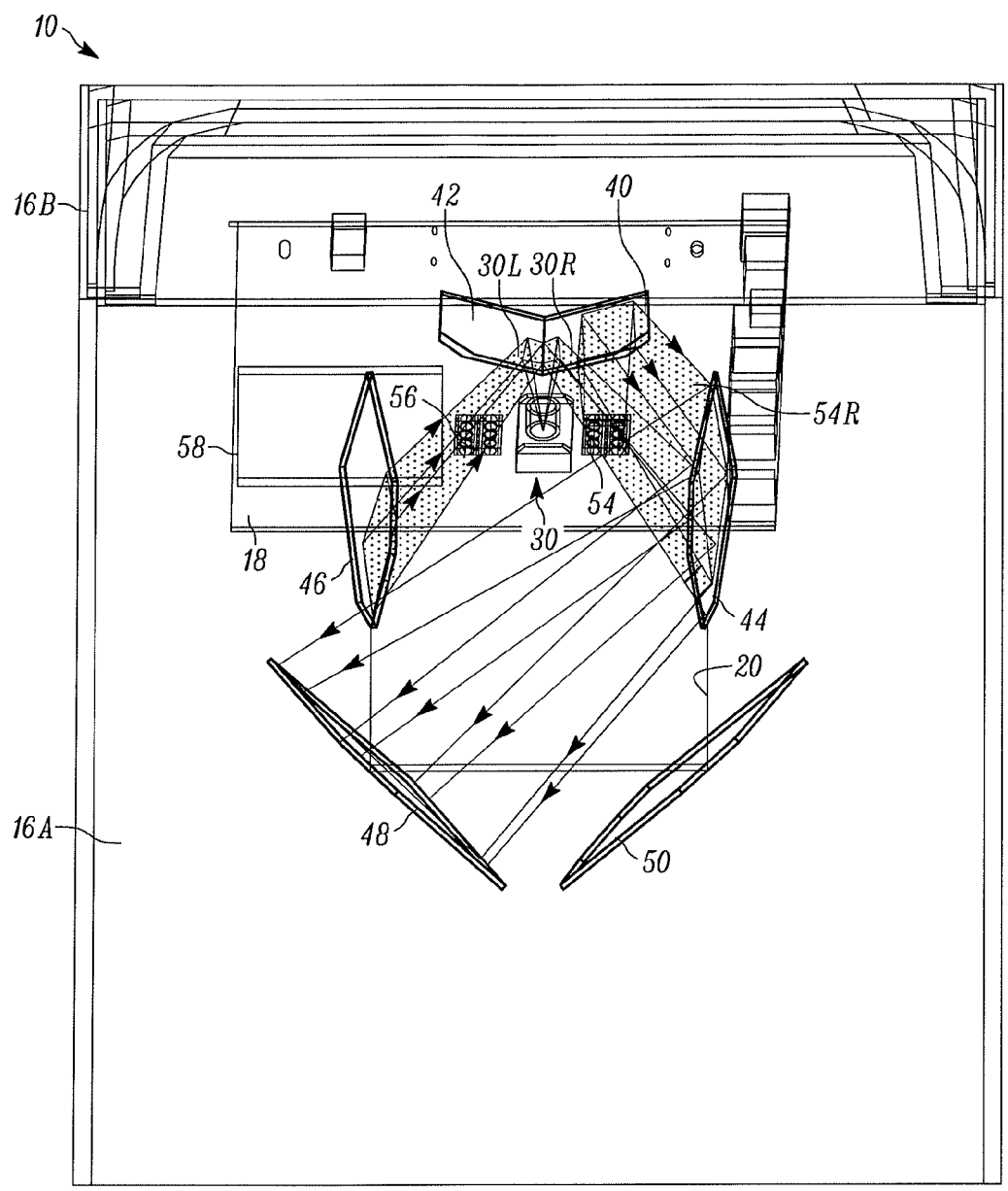
FIG. 9 is a view analogous to FIG. 4 and showing an intermediate part of the path along which illumination light travels.
Figure 10:
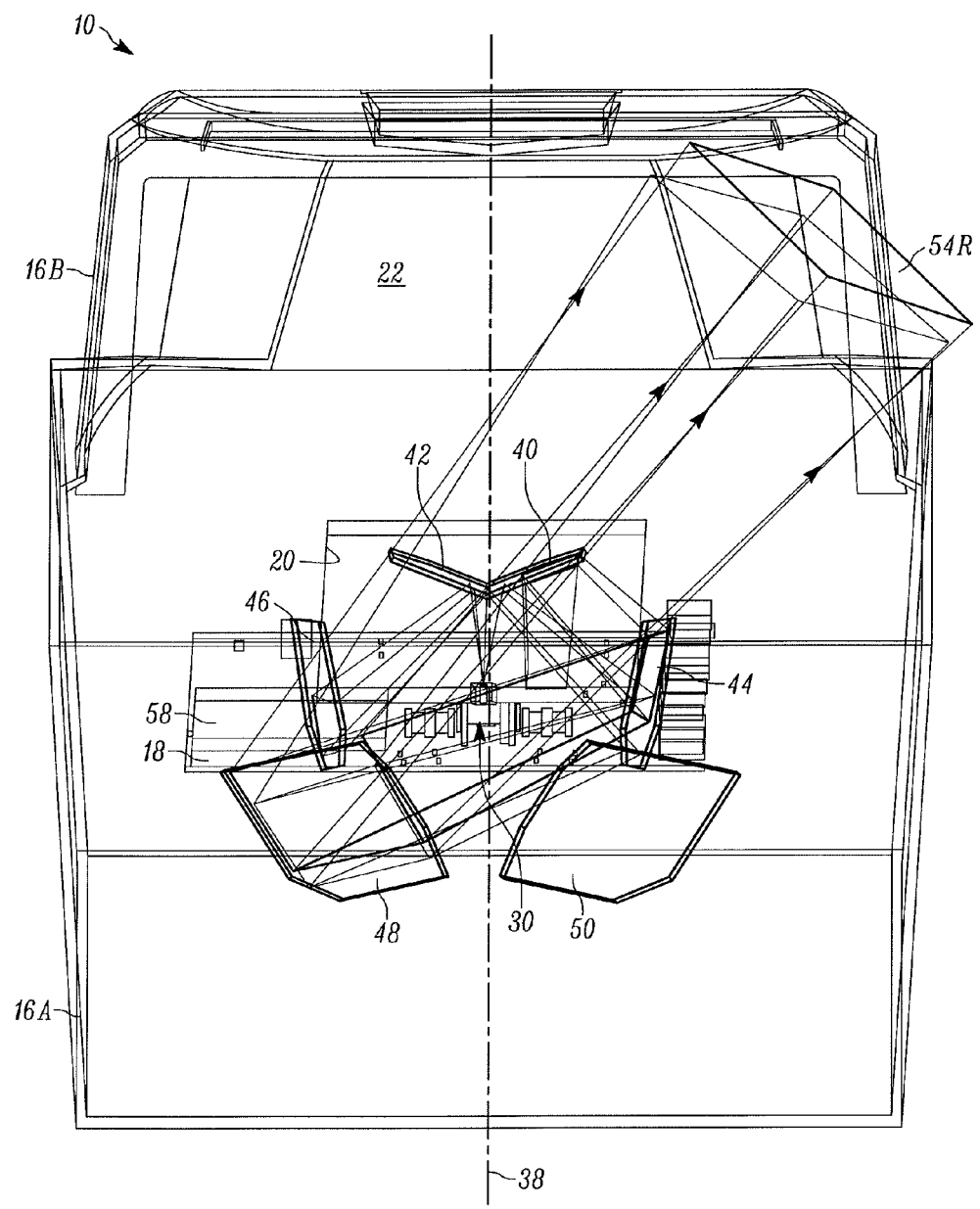
FIG. 10 is a view analogous to FIG. 5 and showing a leading part of the path along which illumination light travels through the horizontal window.

FIGS. 8-10 are analogous to FIGS. 3-5, but also show how the illumination light shares the same travel path as the return illumination light and share the same mirrors and mirror portions. In FIG. 8, the first illumination source 54 emits illumination light 54R to the same first overhead mirror portion 40 that reflected the return illumination light to the imager 30 over the subfield 30R. In FIG. 9, the illumination light 54R reflected off the first overhead mirror portion 40 is directed to the same first relay mirror 44 discussed above, and the illumination light 54R reflected off the first relay mirror 44 is directed to the same first field mirror 48 discussed above. In FIG. 10, the illumination light 54R reflected off the first field minor 48 is directed outwardly through the horizontal window 20 at a tilted angle relative to, and slanted towards, the upright window 20. To simplify the drawings, the illumination light emitted from the second illumination source 56 has not been shown, but it will be understood that it is reflected off the second mirrors 50, 46 and the second overhead mirror portion 42 in the same manner as that described above for the illumination light 54R.

Since the travel paths for the return illumination light and for the illumination light are congruent and partially overlap in the scan zone, parallax is minimized, thereby allowing the illumination light to be concentrated into the narrowest possible light bundle, maximizing energy efficiency, and minimizing the number of LEDs needed to provide sufficient illumination. The minimum parallax reduces the possibility that the bright, pulsed illumination light will be seen by an operator or customer, as compared to workstations having a lot of parallax that have to illuminate a much wider angular volume of space. When a larger volume of space is illuminated, it is more difficult to position the illumination light in a place where it cannot be easily seen.

The above-described split along the longer row axis of the two halves of the imager 30 means that the two halves can be exposed alternately and independently. In other words, the subfield 30R can capture an image of the target 14, and then the subfield 30L can capture another image of the target 14. Each half can run at a full frame rate of the imager so that no throughput is lost. The alternating exposures and the concomitant alternate energizations of the illuminating LEDs 54, 56 also avoids the prior art problem of having the illumination light from a first illuminating source reflect off the mirrors and interfere with the image capture of a target illuminated by the second illuminating source, and vice versa.

In use, a user, such as a person working at a supermarket checkout counter, or a customer in a self-checkout stand, processes the product 12 bearing the UPC symbol 14 thereon past the horizontal window 20 by swiping the product 12 across the horizontal window 20, or by presenting and momentarily holding the product 12 at the horizontal window 20. The symbol 14 may located on any of the top, bottom, right, left, front and rear, sides of the product 12, and the imager 30 will capture the illumination light reflected, scattered, or otherwise returning from the symbol 14 through the horizontal window 20. Both subfields 30R, 30L substantially fully occupy the scan zone and pass through the horizontal window 20 along different intersecting directions to read a plurality of sides of the product. Each subfield 30R, 30L can read the bottom side of the product, as well as the side of the product opposite to the upright window and either the leading or trailing side of the product.

In the foregoing specification, specific embodiments have been described. However, one of ordinary skill in the art appreciates that various modifications and changes can be made without departing from the scope of the invention as set forth in the claims below. For example, the workstation need not be a dual window, bioptical workstation, but could be a single window workstation, such as a flat bed scanner. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for imaging targets, comprising:
a housing;
a window supported by the housing;
an exposable, solid-state imager supported by the housing and having an array of image sensors with a field of view looking along a vertical axis;
an energizable, illuminating assembly supported by the housing and operative for illuminating a target through the window with illumination light;
a compact optical arrangement supported by the housing, and including a pair of first and second overhead mirror portions positioned along the axis directly above the imager and operative for splitting the field of view of the imager into a pair of first and second subfields of view, a pair of first and second relay mirrors spaced away from the axis and respectively facing the first and second overhead mirror portions, and a pair of first and second field mirrors spaced away from the axis and respectively facing the first and second relay mirrors; and
a controller for energizing the illuminating assembly to illuminate the target, and for exposing a first part of the imager to capture return illumination light from the target passing through the window and successively reflected by the first field mirror, the first relay mirror, and the first overhead mirror portion to the imager over the first subfield of view, and for exposing a second part of the imager to capture return illumination light from the target passing through the window and successively reflected by the second field mirror, the second relay mirror, and the second overhead mirror portion to the imager over the second subfield of view.

2. The apparatus of claim 1, wherein each overhead mirror portion and each mirror is a generally planar, fold mirror.

3. The apparatus of claim 1, wherein the first and second overhead mirror portions, the first and second relay mirrors, and the first and second field mirrors are symmetrically positioned relative to the axis.

4. The apparatus of claim 1, wherein the first and second overhead mirror portions are separate, generally planar, fold mirrors having beveled edges abutting each other.

5. The apparatus of claim 1, wherein the first and second overhead mirror portions are separate, generally planar, fold mirrors having beveled edges that are spaced apart along the axis.

6. The apparatus of claim 1, wherein the illuminating assembly includes a pair of first and second illumination light sources, and wherein the controller is operative for energizing the first and second illumination light sources for illuminating the target with illumination light.

7. The apparatus of claim 6, wherein the first overhead mirror portion, the first relay mirror, and the first field mirror successively reflect the illumination light emitted by the first illumination light source to the target, and wherein the second overhead mirror portion, the second relay mirror, and the second field mirror successively reflect the illumination light emitted by the second illumination light source to the target.

8. The apparatus of claim 6, wherein the imager is mounted on a printed circuit board, and wherein the first and second illumination light sources are mounted on the board adjacent the imager.

9. The apparatus of claim 1, wherein the image sensors are arranged in mutually orthogonal rows and columns, and wherein the field of view is split by the first and second overhead mirror portions along a central one of the rows.

10. The apparatus of claim 1, wherein the controller is operative for alternately and subsequently exposing a second part of the imager to capture return illumination light from the target passing through the window and successively reflected by the second field mirror, the second relay mirror.

11. A point-of-transaction workstation for processing products by electro-optically imaging targets associated with the products, comprising:
a housing having an upright window located in an upright plane, and a window located in a generally plane that intersects the upright plane, the windows bounding an area in which each product is presented for processing;
an exposable, solid-state imager supported by the housing and having an array of image sensors with a field of view looking along a vertical axis;
an energizable, illuminating assembly supported by the housing and operative for illuminating a target through the window with illumination light;
a compact optical arrangement supported by the housing, and including a pair of first and second overhead mirror portions positioned along the axis directly above the imager and operative for splitting the field of view of the imager into a pair of first and second subfields of view, a pair of first and second relay minors spaced away from the axis and respectively facing the first and second overhead minor portions, and a pair of first and second field minors spaced away from the axis and respectively facing the first and second relay minors; and
a controller for energizing the illuminating assembly to illuminate the target, and for exposing a first part of the imager to capture return illumination light from the target passing through the window and successively reflected by the first field mirror, the first relay mirror, and the first overhead mirror portion to the imager over the first subfield of view, and for exposing a second part of the imager to capture return illumination light from the target passing through the window and successively reflected by the second field minor, the second relay mirror, and the second overhead mirror portion to the imager over the second subfield of view.

12. The workstation of claim 11, wherein the first and second field mirrors capture the return illumination light from the target along paths that are inclined toward the upright window.

13. The workstation of claim 11, wherein the illuminating assembly includes a pair of first and second illumination light sources, and wherein the controller is operative for energizing the first and second illumination light sources for illuminating the target with illumination light.

14. The workstation of claim 11, wherein the image sensors are arranged in mutually orthogonal rows and columns, and wherein the field of view is split by the first and second overhead mirror portions along a central one of the rows.

15. A method of imaging targets, comprising:
supporting a window on a housing;
directing a field of view of an exposable, solid-state imager to look along a vertical axis;
illuminating a target through the window with illumination light from an energizable illuminating assembly;
splitting the field of view of the imager into a pair of first and second subfields of view by positioning a pair of first and second overhead mirror portions along the axis directly above the imager;
spacing a pair of first and second relay mirrors away from the axis to respectively face the first and second overhead mirror portions;
spacing a pair of first and second field mirrors away from the axis to respectively face the first and second relay mirrors;
energizing the illuminating assembly to illuminate the target;
exposing a first part of the imager to capture return illumination light from the target passing through the window and successively reflected by the first field mirror, the first relay mirror, and the first overhead mirror portion to the imager over the first subfield of view; and
exposing a second part of the imager to capture return illumination light from the target passing through the window and successively reflected by the second field mirror, the second relay mirror, and the second overhead mirror portion to the imager over the second subfield of view.

16. The method of claim 15, and symmetrically positioning the first and second overhead mirror portions, the first and second relay mirrors, and the first and second field mirrors relative to the axis.

17. The method of claim 15, and configuring the illuminating assembly with a pair of first and second illumination light sources, and energizing the first and second illumination light sources for illuminating the target with illumination light.

18. The method of claim 7, and successively reflecting the illumination light emitted by the first illumination light source to the target in succession by the first overhead mirror portion, the first relay mirror, and the first field mirror, and successively reflecting the illumination light emitted by the second illumination light source to the target in succession by the second overhead mirror portion, the second relay mirror, and the second field mirror.

19. The method of claim 15, and configuring the imager with an array of image sensors arranged in mutually orthogonal rows and columns, and wherein the field of view is split by the first and second overhead mirror portions along a central row.

20. The method of claim 15, and wherein said exposing a second part of the imager includes alternately and subsequently exposing a second part of the imager.

* * * * *

UNITED STATES PATENT AND TRADEMARK OFFICE
CERTIFICATE OF CORRECTION

PATENT NO.         : 9,697,406 B2
APPLICATION NO.    : 15/074018
DATED              : July 4, 2017
INVENTOR(S)        : Edward D. Barkan et al.

Page 1 of 1

It is certified that error appears in the above-identified patent and that said Letters Patent is hereby corrected as shown below:

In the Claims

In Claim 11, Column 10, Lines 49-54 replace "view, a pair of first and second relay minors spaced away from the axis and respectively facing the first and second overhead minor portions, and a pair of first and second field minors spaced away from the axis and respectively facing the first and second relay minors: and" with --view, a pair of first and second relay mirrors spaced away from the axis and respectively facing the first and second overhead mirror portions, and a pair of first and second field mirrors spaced away from the axis and respectively facing the first and second relay mirrors: and--

In Claim 11, Column 10, Line 64 replace "reflected by the second field minor, the second relay" with --reflected by the second field mirror, the second relay--

In Claim 12, Column 11, Line 2 replace "second field minors capture the return illumination light" with --second field mirrors capture the return illumination light--

In Claim 14, Column 11, Line 13-14 replace "second overhead minor portions along a central one of the rows." with --second overhead mirror portions along a central one of the rows.--

Signed and Sealed this
Fourteenth Day of August, 2018

Andrei Iancu
*Director of the United States Patent and Trademark Office*